United States Patent [19]
Harendza-Harinxma

[11] 3,772,496
[45] Nov. 13, 1973

[54] METHODS OF FORMING A CONDUCTIVE PATH USING AN OXYGEN PLASMA TO REDUCE REFLECTIVITY PRIOR TO LASER MACHINING

[75] Inventor: Alfred Joseph Harendza-Harinxma, Lawrenceville, N.J.

[73] Assignee: Western Electric Company Incorporated, New York, N.Y.

[22] Filed: Oct. 26, 1971

[21] Appl. No.: 192,388

[52] U.S. Cl. .......... 219/121 LM, 29/620
[51] Int. Cl. .......... B23k 9/00
[58] Field of Search .......... 219/121 L, 121 EB; 29/600, 601, 620; 117/8, 95, 212

[56] References Cited

UNITED STATES PATENTS

| | | | |
|---|---|---|---|
| 3,486,221 | 12/1969 | Robinson | 219/121 LM |
| 3,534,472 | 10/1970 | Jong et al. | 29/620 |
| 3,594,261 | 7/1971 | Broerman | 219/121 LM |
| 3,293,587 | 12/1966 | Robinson | 29/620 |
| 3,530,573 | 9/1970 | Helgeland | 219/121 LM |
| 3,364,087 | 1/1960 | Solomon et al. | 219/121 LM |
| 2,838,735 | 6/1958 | Davis | 333/31 |

OTHER PUBLICATIONS

"Laser Cutting" Engineering, January 29 and February 5, 1971, pp. 779–782

"Gas Jet Laser Cutting", British Weldıng Journal, August 1967, pp. 443–445

"Lasers in Industry", Proceedings of IEEE, Vol. 57, No. 2 February 1969, pp. 114–134

*Primary Examiner*—C. L. Albritton
*Assistant Examiner*—George A. Montanye
*Attorney*—W. M. Kain et al.

[57] ABSTRACT

A layer of a conductive material, such as copper, is applied onto a dielectric surface. The structure is thereafter treated to render selected portions non-conductive by removal of the conductive layer from the selected portions. All remaining portions of the conductive material then constitute conductive paths on the underlying dielectric matrial. Treatment involves the impinging of a concentrated beam of energy, which may be provided by a laser source, onto the conductive material in the presence of a wet oxygen plasma. The wet oxygen plasma continually forms an oxide coating on the copper in the vicinity of beam impingement, markedly decreasing the reflectivity and thermal conductivity of the surface such that laser treatment becomes feasible. The laser beam vaporizes completely through the depth of the copper coating. The technique may be employed in forming helical conductor paths on the inner walls of sections of millimeter waveguide tubing.

5 Claims, 1 Drawing Figure

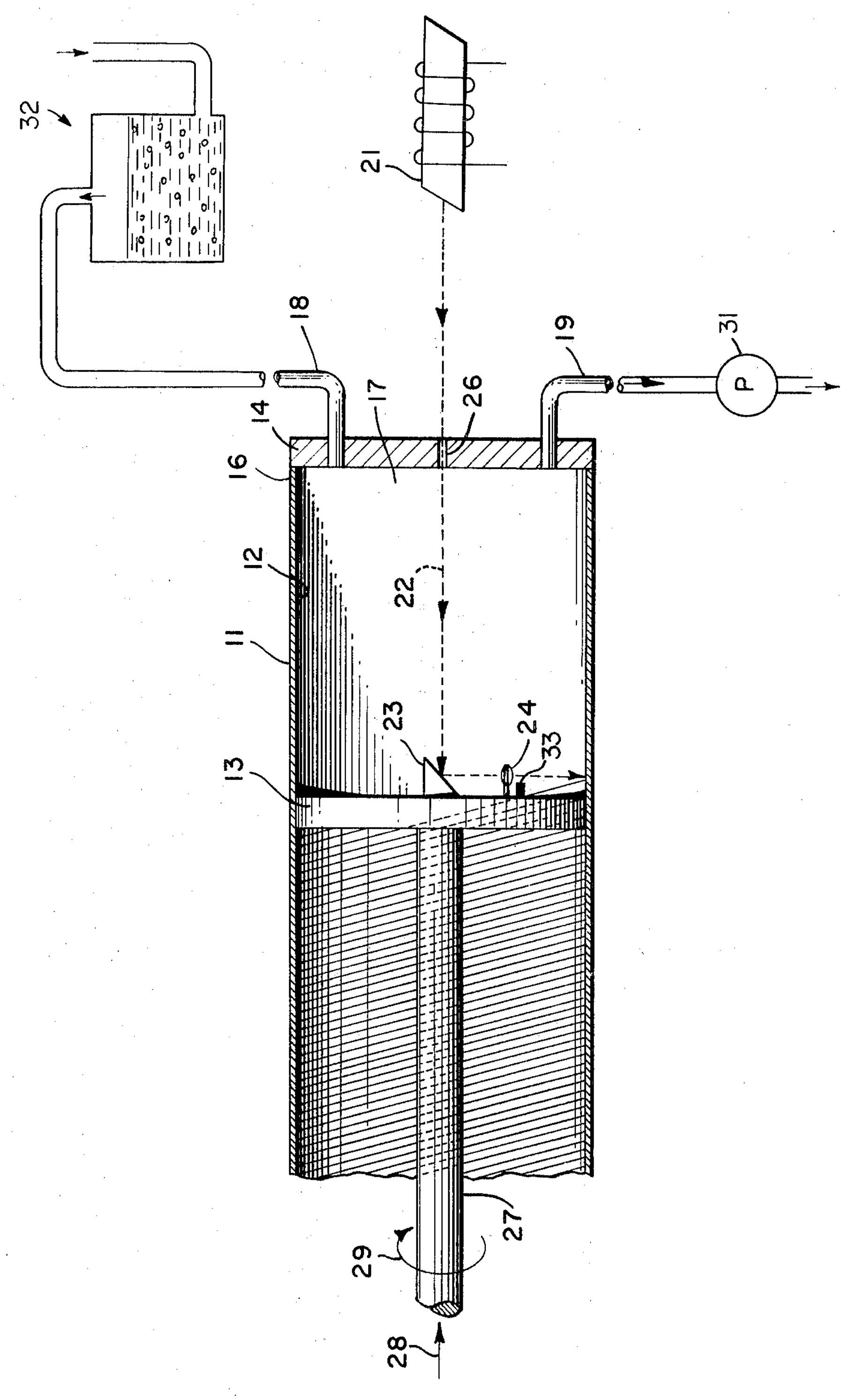

METHODS OF FORMING A CONDUCTIVE PATH USING AN OXYGEN PLASMA TO REDUCE REFLECTIVITY PRIOR TO LASER MACHINING

BACKGROUND OF THE INVENTION

This invention relates to a method of forming a conductive path on a selected portion of a surface and, more particularly, to forming a conductive path by rendering non-conductive all portions of a conductive surface other than those selected to be conductive.

In the art of manufacturing electrically conductive members, it is known to form a conductive coating on a dielectric base and subsequently to remove, for example, by etching or high intensity energy beam techniques, all portions of the conductive coating other than those desired to form a path on the base. It has also been suggested to impinge an oxidizing gas into a relatively high temperature zone wherein portions of a conductive, metal coating which are not to constitute current paths are being vaporized through the use of a high energy electron beam. In such case, the oxidizing gas serves to prevent conductive bridging of adjacent current paths in the event of metal vapor recondensation along the removal zone through the oxidation of any such recondensed metal vapors into a dielectric, metal oxide.

In certain instances, however, the use of laser material treatment techniques may be advantageous. For example, in the manufacture of cylindrical millimeter waveguide tubing, it is desired to form a helical, electrically conductive path having very closely spaced convolutions on a dielectric layer covering the inner wall of a tubular conductor. Since extremely close lines may be formed by laser treatment processes, the utilization of such processes is of apparent interest. The low contamination characteristics of laser treatment operations are also considered desirable. The conductive material to be treated, in the case of millimeter waveguide tubing, is, however, oridinarily copper of relatively high purity. The copper material has high reflectivity properties and is a relatively good thermal conductor. Laser treatment is, therefore, quite difficult if conventional techniques are to be employed.

With respect to the manufacture of cylindrical millimeter waveguide having a helical conductive path along its inner wall, an additional problem arises. The manufacture of relatively long sections of cylindrical waveguide tubing of relatively small inner diameter, such as 5 or 10 meter lengths of approximately 50 to 60 millimeter inner diameter tubing, has previously involved a number of time-consuming operations. Typically, very fine, insulated copper wires are wound helically onto a mandrel in close-spaced, helical convolutions. A number of electrically lossy and/or dielectric strands are wound onto the mandrel over the helical copper windings. The wound mandrel is then inserted into a section of steel waveguide tubing. An epoxy material is next forced into the tubing section and between the helical convolutions on the mandrel. The epoxy is thereafter cured. Finally, the mandrel, which was initially coated with a mold release material, is withdrawn axially from the tubing section. The desired structure results. Clearly, a simpler, more quickly performed method for forming a closely spaced helical pattern of copper or other conductive material on a dielectric surface would be advantageous.

SUMMARY OF THE INVENTION

An object of the invention resides in new and improved methods of forming a conductive path on a selected portion of a surface.

The invention contemplates the introduction of a wet oxygen plasma into the vicinity of an electrically conductive surface. The surface may be an electrically conductive interior surface of a hollow member, such as a section of cylindrical millimeter waveguide tubing. The conductor material typically constitutes a metal coating, such as copper, over a dielectric material lining the inner wall of a steel tube. A laser beam traces a path along the copper coating, rendering electrically non-conductive all irradiated portions of the surface through vaporization of the copper coating. All other portions of the copper coating form conductive paths on the underlying dielectric material. The wet oxygen plasma continuously forms an oxide layer on the copper coating, markedly decreasing the reflectivity and thermal conductivity of the coating such that laser treatment is effective to vaporize completely through the coating. The presence of the wet oxygen plasma also tends to render any copper oxide formation in the tubing cupric, rather than cuprous. The former is believed preferable over the latter in the case of millimeter waveguide tubing.

Apparatus for performing the method of the invention may include a piston for sealing the interior of the hollow tubular member. A reflector is mounted on the piston and a laser source directs a beam of laser radiation onto the reflector, from which the beam is reflected onto an inner wall of the hollow member. The piston is advanced axially and rotated to trace a helical or other laser beam path on the inner wall. The piston seals off from the zone still to be treated those portions of the inner wall past which the piston and reflector have already advanced. An exhaust system, meanwhile, withdraws vapors from the interior of the hollow member.

BRIEF DESCRIPTION OF THE DRAWING

The single FIGURE of drawing illustrates apparatus which may be used to practice the method of the invention.

DETAILED DESCRIPTION

Referring to the drawing, a cylindrical section of steel tubing 11 has a thin copper coating along its inner wall 12. The copper coating covers one or more layers of a dielectric material located intermediate the copper coating and the steel tubing. By way of example, a thin layer of silicon dioxide, say 60,000 Angstroms thick, may have been sputtered onto the inner wall 12 of the section of steel tubing 11. The copper coating may thereafter have been sputtered onto the silicon dioxide layer to a similar depth.

It is desired to treat the electrically conductive copper coating on the tube inner wall 12 such that a helical dielectric path with closely spaced convolutions will be formed in the copper. The formation of such a helical dielectric path will, of course, cause a corresponding helical, electrically conductive, copper path to remain intermediate the closely spaced convolutions of the dielectric helix.

The tubing 11 is to be used as a section of waveguide in the transmission of millimeter wavelength communication signals. The desirability of the use in millimeter waveguide systems of the described structure, namely a copper helix surrounded by a layer of dielectric material and encased within steel tubing, is known, as taught by U. S. Pat. No. 2,950,454, which issued on Aug. 23, 1960 to Hans-Georg Unger.

A piston 13 is shown in the drawing within the bore of the section of tubing 11. The piston has an outer diameter substantially equal to the inner diameter of the tubing, for example, a diameter of the order of 50 to 60 millimeters. The piston 13, thus, functions to seal the portion of the bore of the tubing forward of the piston from that rearward of the piston. A forward portion of the tubing may be taken to be that extending toward the right side of the drawing.

An end plate 14 covers a forward end 16 of the section of tubing 11. The end plate 14 acts to seal the bore of the tubing opposite to the piston 13 such that a fully sealed chamber 17 is defined within the tubing forward of the piston 13. An inlet line 18 and an exhaust line 19 communicate with the sealed chamber 17 through the end plate 14.

A laser source 21 is adapted to provide a beam of laser energy 22 along the axis of the section of tubing 11 from a position forward of the end plate 14. A mirror or prism 23 is mounted centrally on the forward face of the piston 13. The mirror has a reflective surface disposed at an angle of 45° to the axis of the section of tubing, so as to receive the beam 22 and reflect the beam radially through a focusing lens 24 and onto the inner wall 12 of the tubing. A window 26 serves to transmit the laser energy through the end plate 14. Alternatively, the entire end plate might be formed of a material transparent to laser energy. A piston rod 27 is connected to the rearward face of the piston 13 and is adapted to advance the piston in a forward direction, as indicated by arrow 28, and simultaneously to rotate the piston about the axis of the section of tubing 11, as shown by arrow 29.

In the practice of the method of the invention, with the piston 13 initially held in a withdrawn position toward or at a rearward end of the section of tubing, and with the exhaust line 19 coupled to a conventional vacuum pump 31, an atmosphere rich in water vapor and oxygen is introduced into the enlarged sealed chamber 17 through the inlet line 18. The desired atmosphere may be provided by bubbling oxygen through boiling water as shown at 32 in the drawing. The subsequent impingement of a focused laser beam onto the inner wall 12 of the tubular member 11 will provide sufficient energy to generate a wet oxygen plasma, rich in water vapor, in the vicinity of the beam impingement, which plasma is desirable in the laser treatment operation. In addition, a high voltage discharge may be established to the instantaneous point of laser treatment, e.g., from an electrode 33 suitably mounted on the piston 13, through the atmosphere in the sealed chamber 17 of high water vapor content, as a part of the process of generating the desired wet oxygen plasma, rich in water vapor, in the vicinity of the point of treatment.

The piston 13, and with it the mirror 23 and focusing lens 24, is caused to advance in the direction of the arrow 28 and to rotate (arrow 29) by operation of the piston rod 27 and conventional drive mechanisms (not shown). Simultaneously, the laser source 21 is operated to impinge the beam 22 onto the mirror 23. The mirror causes the beam 22 to be reflected radially onto the copper-coated inner wall 12 of the section of tubing 11 through the focusing lens 24, the beam traversing a helical path with a pitch governed by the relative rates of linear advance and of rotation of the piston 13. A laser energy level of approximately one kilowatt is suitable, when applied to the copper coating on the inner wall 12, to vaporize the copper coating through to the underlying dielectric layer.

The laser energy acts in the presence of the wet oxygen plasma, to vaporize the copper coating at all points along the helical path traced by the beam 22 on the inner wall 12. More specifically, the plasma initially effects an oxidation of the surface of the copper coating on the inner wall in the vicinity of the laser beam impingement. As a result, the highly reflective, high thermal conductivity copper coating is rendered suitable for laser treatment by the surface presence of a copper oxide composition which is relatively highly absorptive of laser energy and of relatively low thermal conductivity. Thus, the portions of the copper coating treated by the laser are vaporized, providing the desired dielectric helical path in the copper coating, due to the presence of the wet oxygen plasma in the treatment area. Any tendency of the laser beam to expose underlying, pure copper regions of the copper coating during the treatment, such as would otherwise cause a large portion of the laser beam energy to be reflected back without further rendering the copper coating dielectric, is counterbalanced by the continuous oxidizing effect of the wet oxygen plasma within the tubing.

The use of the wet oxygen plasma provides an additional advantage in the case of millimeter waveguide manufacture. It is believed that the presence of cupric oxide material in the processed waveguide is preferable to that of cuprous oxide. The aqueous atmosphere provided by the wet oxygen plasma within the section of tubing 11 tends to render any copper oxide formation cupric, rather than cuprous.

During the laser and wet oxygen plasma treating process, the exhaust line 19 serves to exhaust any copper vapor or other possible contaminant from the decreasing-volume, sealed chamber 17. The piston 13, moreover, acts to seal those portions of the inner wall 12 already treated, i.e., to the rear of the piston, from the further treatment process taking place just forward of the piston.

It is to be understood that the above-described method is simply illustrative of one embodiment of the invention. The method is adaptable to forming other conductor-nonconductor patterns on the inner walls of sections of millimeter waveguide or other tubing, e.g., a pattern of spaced, conductive peripheral rings. Indeed, the method may be adapted to form any desired patterns on non-cylindrical and/or non-interior surfaces of any number of different types of elements. Materials other than copper may, of course, be treated in accordance with the methods disclosed above. Moreover, oxidation rather than vaporization of selected portions of a conductive layer might be practicable in certain instances as the mechanism for rendering nonconductive the selected portions. Numerous other modifications may be made without departing from the invention.

What is claimed is:

1. A method of treating a selected portion of the inner wall of a tube so as to remove from an underlying dielectric surface a coating formed of a normally reflective, electrically conductive material, the material being subject to oxidation into a less reflective state, the method comprising the steps of:

a. introducing continuously into the interior of the tube an oxygen atmosphere, rich in water vapor, so as to contact said atmosphere with the electrically conductive coating at said selected portion of the tube inner wall; while b. applying a partial vacuum continuously to the interior of the tube to rarefy said atmosphere at selected portion of the tube inner wall; and while c. applying to said rarefied atmosphere within the tube a level of energy sufficient to form a wet oxygen plasma, rich in water vapor, at said selected portion of the tube inner wall so as to oxidize the electrically conductive coating at said selected portion of the tube inner wall; and d. directing along said selected portion of the tube inner wall, from a position within the tube, a concentrated beam of energy at an energy level sufficient to remove oxidized coating along said selected portion of the tube inner wall in the presence of said wet oxygen plasma.

2. In the method of claim 1, said step (a) comprising:

bubbling oxygen through a body of boiling water to form said atmosphere externally of the tube, and then introducing said atmosphere into the interior of the tube so as to contact the electrically conductive coating at said selected portion of the tube inner wall.

3. In the method of claim 1, said step (c) comprising:

establishing a high voltage discharge through said rarefied atmosphere at said selected portion of the tube inner wall.

4. In the method of claim 1, said step (d) comprising:

positioning a reflector element within the tube, impinging a concentrated beam of energy onto the reflector element so as to reflect the beam onto the inner wall of the tube, displacing the reflector element relative to the tube along a path selected such that the reflected beam is directed along the selected portion of the tube inner wall, and continuously fluid-sealing those portions of the tube inner wall past which the reflected beam has been displaced from those portions of the tube inner wall past which the reflected beam has not yet been displaced.

5. In the method of claim 4, said displacing and fluid-sealing steps comprising:

positioning the reflector element on a sealing element which provides a fluid seal across the tube and advancing the sealing element and the reflector element together axially through the tube.

* * * * *